(12) United States Patent
Hou

(10) Patent No.: US 11,034,080 B2
(45) Date of Patent: Jun. 15, 2021

(54) PHOTOCURING-TYPE THREE-DIMENSIONAL PRINTING METHOD AND DEVICE

(71) Applicant: PRISMLAB CHINA LTD., Shanghai (CN)

(72) Inventor: Feng Hou, Shanghai (CN)

(73) Assignee: PRISMLAB CHINA LTD., Shanghai (CN)

( * ) Notice: Subject to any disclaimer, the term of this patent is extended or adjusted under 35 U.S.C. 154(b) by 93 days.

(21) Appl. No.: 16/517,507

(22) Filed: Jul. 19, 2019

(65) Prior Publication Data

US 2019/0337219 A1  Nov. 7, 2019

Related U.S. Application Data

(63) Continuation of application No. PCT/CN2018/076797, filed on Feb. 14, 2018.

(30) Foreign Application Priority Data

Jan. 19, 2017 (CN) .......................... 201710044588.4

(51) Int. Cl.
*B33Y 50/02* (2015.01)
*B29C 64/10* (2017.01)
*B29C 64/386* (2017.01)
*B33Y 10/00* (2015.01)

(52) U.S. Cl.
CPC ............ *B29C 64/10* (2017.08); *B29C 64/386* (2017.08); *B33Y 10/00* (2014.12); *B33Y 50/02* (2014.12)

(58) Field of Classification Search
CPC ..................................................... B33Y 50/02

USPC .......................................................... 700/118
See application file for complete search history.

(56) References Cited

U.S. PATENT DOCUMENTS

| 5,198,159 A * | 3/1993 | Nakamura ............ B29C 64/135 264/401 |
| 2011/0101570 A1 | 5/2011 | John et al. |
| 2016/0082663 A1* | 3/2016 | Asahina ................ B29C 64/129 425/150 |

(Continued)

FOREIGN PATENT DOCUMENTS

| CN | 1428656 A | 7/2003 |
| CN | 103213282 A | 7/2013 |

(Continued)

OTHER PUBLICATIONS

Office Action of CN Patent Application No. 201710044588.4.
EP Search Report of EP Application No. 18741514.6.

*Primary Examiner* — Suresh Suryawanshi
(74) *Attorney, Agent, or Firm* — Kilpatrick Townsend & Stockton, LLP

(57) ABSTRACT

A photocuring-type three-dimensional printing method and device. The photocuring-type three-dimensional printing method comprises the following steps: obtaining a three-dimensional data model of a printing object; dividing the three-dimensional data model into a plurality of layers; identifying exposed areas and internal areas of various layers for at least a portion of the layers of the three-dimensional data model; performing exposure at each layer for the exposed areas of the various layers, and performing an exposure process at an interval of multiple layers for the internal areas of the various layers.

19 Claims, 15 Drawing Sheets

(56) References Cited

U.S. PATENT DOCUMENTS

| | | | |
|---|---|---|---|
| 2016/0107380 A1* | 4/2016 | Smoot | B29C 64/124 |
| | | | 264/401 |
| 2017/0004227 A1* | 1/2017 | Yoshida | G06T 19/00 |
| 2018/0126663 A1* | 5/2018 | Jun | B33Y 10/00 |
| 2019/0210285 A1* | 7/2019 | Tomioka | B33Y 40/20 |
| 2020/0086554 A1* | 3/2020 | Hou | B29C 64/321 |

FOREIGN PATENT DOCUMENTS

| | | |
|---|---|---|
| CN | 104802400 A | 7/2015 |
| CN | 105666885 A | 6/2016 |
| EP | 0429196 A2 | 5/1991 |
| EP | 1179411 A2 | 2/2002 |
| EP | 1894705 A2 | 3/2008 |
| EP | 2241430 A1 | 10/2010 |

\* cited by examiner

300

300

PHOTOCURING-TYPE THREE-DIMENSIONAL PRINTING METHOD AND DEVICE

CROSS-REFERENCES TO RELATED APPLICATIONS

This application is the Continuation Application of International Application No. PCT/CN2018/076797, filed on Feb. 14, 2018, which claims priority to Chinese Patent Application No. 201710044588.4, filed on Jan. 19, 2017, both of which are incorporated by reference in their entireties for any and all purposes.

FIELD OF THE DISCLOSURE

The present disclosure relates to three-dimensional printing technology, and more particularly to a photocuring-type three-dimensional printing method and device.

BACKGROUND

Three-dimensional (3D) printing technology is based on a three-dimensional model designed by computer, it takes use of the software layered discrete and numerical controlled molding system to stack the special materials such as metal powder, ceramic powder, plastic and cell tissue and bond layer by layer by means of laser beam and hot melt nozzle, and finally superimpose to create a physical product. Different from the traditional manufacturing industry which builds the final product by shaping and cutting raw materials by machining methods such as molding and milling, the three-dimensional printing transforms a three-dimensional entity into several two-dimensional planes, and builds the product by processing the materials and superimposing them layer by layer, which significantly reduces manufacturing complexity. This digital manufacturing mode does not require complicated processes, massive machine tool and a lot of manpower, it can directly generate parts with various complicated shapes from computer graphics data, which enables the manufacturing to be extended to a wider range of production people.

At present, the molding method of three-dimensional printing technology is still evolving, and the materials used are also various. Among various molding methods, photocuring is a relatively mature method. The photocuring method accumulates materials into certain form based on the principle that the photocurable resin can be cured by ultraviolet light. The method has the characteristics of high molding precision, good surface smoothness, and high material utilization rate.

FIG. 1 shows the basic structure of a photocuring-type three-dimensional printing device. This three-dimensional printing device 100 includes a material tank 110 for containing photocurable resin, an image exposure system 120 for curing the photocurable resin, and a lifting platform 130 for joining the molded workpiece. The image exposure system 120 is positioned above the material tank 110 and can expose beam image to cure the layer of resin which is at the liquid surface of the material tank 110. After the image exposure system 120 exposes the beam image to cure a layer of resin each time, the cured layer of resin will be slightly lowered driven by the lifting platform 130, and a layer of resin is evenly spread out on the top surface of the cured workpiece by a scraper 131 and waiting for the next exposure. In such a cycle, a layer-by-layer accumulated three-dimensional workpiece will be obtained.

However, the photocurable resin has a certain shrink during the curing process, and the percentage of shrink is generally from 2 to 8%, and the shrinkage stress generated by it exerts a force on the surrounding photocurable resin. This force exists on the resins at each position of each layer of the three-dimensional workpiece, and also between the resins of the respective layers. When a large area of resin is cured together, the stress is very significant, resulting in warpage and deformation of the cured resin.

SUMMARY

The problems to be solved by the present disclosure is to provide a photocuring-type three-dimensional printing method and device, which can improve the problem of warpage and deformation of photocured resin.

The present disclosure provides a photocuring-type three-dimensional printing method, comprising the steps of: obtaining a three-dimensional data model of a printing object; dividing the three-dimensional data model into a plurality of layers; identifying exposed areas and internal areas of at least a portion of layers of the three-dimensional data model; performing an exposure at each layer for the exposed areas of the at least a portion of layers, and performing an exposure process at an interval of multiple layers for the internal areas of the at least a portion of layers.

In an embodiment of the disclosure, the method further includes exposing to form a plurality of support pillars in the layers with unexposed internal areas.

In an embodiment of the disclosure, the exposing process includes: dividing the internal areas into a complementary first pattern and a second pattern; exposing the first pattern by a first exposure step; and exposing the second pattern by a second exposure step.

In an embodiment of the disclosure, the exposing process includes: dividing the internal areas into a complementary first pattern and a second pattern; exposing only the first pattern without exposing the second pattern.

In an embodiment of the disclosure, there is a displacement between the first pattern and the second pattern of each layer of the three-dimensional data model.

In an embodiment of the disclosure, the displacement is random.

In an embodiment of the disclosure, the first pattern and the second pattern are diagonal squares in a checkerboard.

In an embodiment of the disclosure, the one-dimensional size of each square is 2-20 pixels.

In an embodiment of the disclosure, the first pattern are squares separated by well-shaped stripe, the second pattern is well-shaped stripe.

In an embodiment of the disclosure, the time of the first exposure step partially overlaps the time of the second exposure step.

In an embodiment of the disclosure, the time of the first exposure step does not overlap with the time of the second exposure step.

In an embodiment of the disclosure, each square has a one-dimensional size of 10-50 pixels, and each well-shaped stripe has a width of 2-10 pixels.

In an embodiment of the disclosure, the method further includes: assigning a first exposure intensity to the exposed areas, and assigning a second exposure intensity to the internal areas, wherein the first exposure intensity is greater than the second exposure intensity; and exposing the exposed areas with the first exposure intensity, and exposing the internal areas with the second exposure intensity.

In an embodiment of the disclosure, the second exposure intensity does not exceed 66% of the first exposure intensity.

In an embodiment of the disclosure, the exposed area includes an upper shell, side edges, and/or a bottom shell.

In an embodiment of the disclosure, the normal thickness of the exposed area is 1-5 pixels.

In an embodiment of the disclosure, assigning the first exposure intensity uniformly to a plurality of layers starting from the bottom of the three-dimensional data model.

In an embodiment of the disclosure, the method further includes: identifying a bottom shell area having a size up to a threshold and an island-shaped area of one or more supporting portions in the layer which are used for supporting the bottom shell area for at least a portion of the layers of the three-dimensional data model; defining a separated area between each of the island-shaped area and the bottom shell area; exposing each of the island-shaped area and the bottom shell area during the first period, and exposing the respective separated area during the second period, the first period is earlier than the second period.

In an embodiment of the disclosure, at least a portion of the second period overlaps with the first period.

In an embodiment of the disclosure, the second period does not overlap with the first period.

In an embodiment of the disclosure, exposing the entire layer simultaneously for a plurality of layers starting from the bottom of the three-dimensional data model.

The present disclosure provides a photocuring-type three-dimensional printing device including memory and processor. The memory stores computer readable instructions. The processor executes the computer readable instructions to implement the steps described below: obtaining a three-dimensional data model of a printing object; dividing the three-dimensional data model into a plurality of layers; identifying exposed areas and internal areas of at least a portion of layers of the three-dimensional data model; performing an exposure at each layer for the exposed areas of the at least a portion of layers, and performing an exposure process at an interval of multiple layers for the internal areas of the at least a portion of layers.

The present disclosure also provides a photocuring-type three-dimensional printing device, comprising: a device for obtaining a three-dimensional data model of a printing object; a device for dividing the three-dimensional data model into a plurality of layers; a device for identifying exposed areas and internal areas of at least a portion of layers of the three-dimensional data model; a device for performing an exposure at each layer for the exposed areas of the at least a portion of layers, and performing an exposure process at an interval of multiple layers for the internal areas of the at least a portion of layers.

Compared with the prior art, the present disclosure adopts the above solution to make other layers less affected by the shrink of each layer during the exposure process by performing exposure at intervals in the vertical direction of printing.

At the same time, the present disclosure exposes the areas regionally in horizontal direction in a large-area region, and exposes small areas that are not adjacent to each other at each exposure, which significantly reduces the shrinkage accumulation caused by the curing of large-area region exposure.

Furthermore, by distinguishing the exposed area and the internal area of the three-dimensional data model and exposing with different exposure intensities, the exposure intensity of the internal area can be made lower than that of the exposed area. As a result, the exposure intensity of the exposed area is much higher than that of the internal area, causing the main source of deformation—the amount of shrinkage of the internal entity area is significantly reduced, and the rise of temperature is reduced, so that the warpage and deformation problems of the three-dimensional model are improved.

In addition, by identifying those large-area bottom shell areas and the island-shaped areas connected by the formed supporting portions, a separated area is defined there between. During the exposure process, expose other areas before expose the separated area, so as to minimize the problem of the tensile stress applied to the supporting portions caused by the shrinkage during the overall exposure of the large area.

BRIEF DESCRIPTION OF THE DRAWINGS

Features and capabilities of the present disclosure are further described by the following embodiments and the accompanying drawings.

EMBODIMENT OF THE PRESENT DISCLOSURE

Embodiments of the present disclosure describing a photocuring-type three-dimensional printing method which can reduce the internal stress generated by the photocurable resin upon curing of a large area, thereby improving the degree of warpage and deformation of the printed workpiece.

Figure 1:
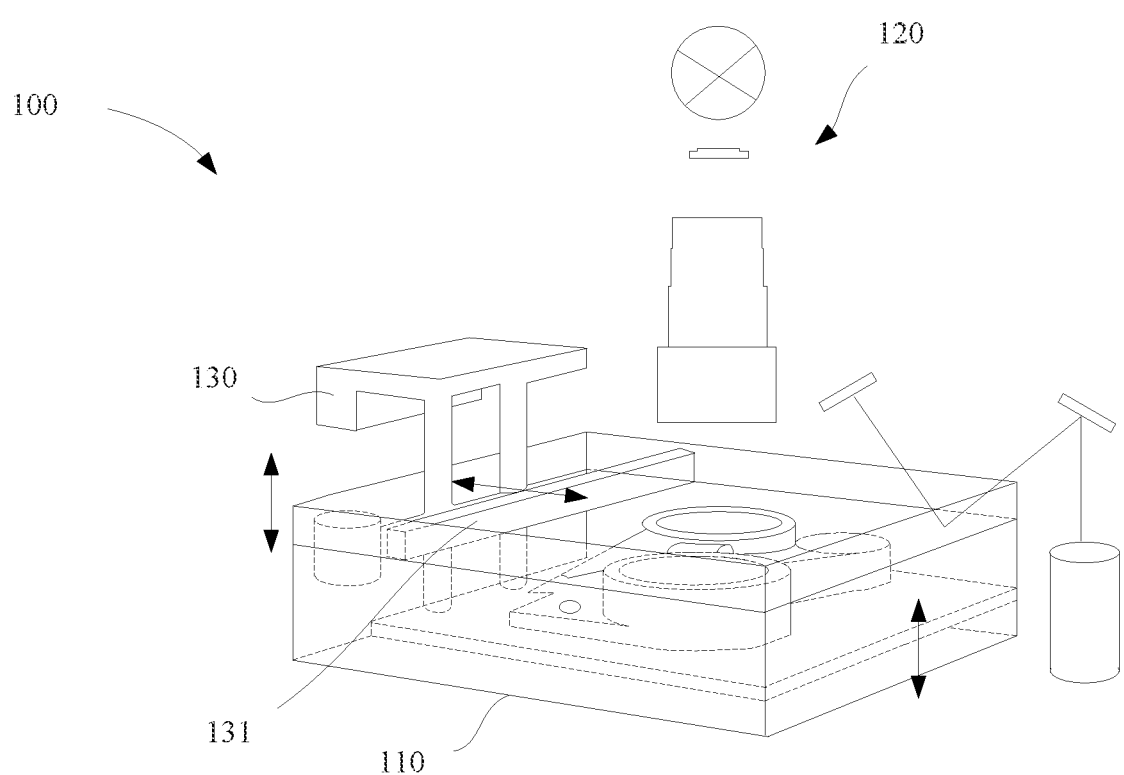
FIG. 1 is the basic structure of a photocuring-type three-dimensional printing device.

FIG. 1 is the basic structure of a photocuring-type three-dimensional printing device. This three-dimensional (3D) printing device 100 includes a material tank 110 for containing photocurable resin, an image exposure system 120 for curing the photocurable resin, and a lifting platform 130 for joining the molded workpiece. The image exposure system 120 is positioned above the material tank 110 and can expose beam image to cure the layer of resin which is at the liquid surface of the material tank 110. After the image exposure system 120 exposes the beam image to cure a layer of resin each time, the cured layer of resin will be slightly lowered driven by the lifting platform 130, and a layer of resin is evenly spread out on the top surface of the cured workpiece by a scraper 131 and waiting for the next exposure. In such a cycle, a layer-by-layer accumulated three-dimensional workpiece will be obtained.

The image exposure system 120 can expose the beam image to the photocurable resin to form the desired exposure pattern. The image exposure system 120 can use various known techniques that are capable of forming a beam image.

For example, in one embodiment, image exposure system 120 may use Digital Light Procession (DLP) projection technology. DLP projection imaging technology is implemented by using a Digital Micromirror Device (DMD) to control the reflection of light. The DMD can be viewed as a mirror. This mirror is made up of hundreds of thousands or even millions of micromirrors. Each micromirror represents a pixel, and the image is composed of these pixels.

In another embodiment, image exposure system 120 may also use liquid crystal display (LCD) projection techniques. The liquid crystal panel includes a plurality of pixels, each of which can individually control the polarization direction of the polarized light. The liquid crystal panel coordinated with the polarizing filter on both sides of the liquid crystal panel can control the light of a certain pixel pass through or not, so the light beam passing through the liquid crystal panel system is a beam image.

The input of the photocuring-type 3D printing device 100 is a three-dimensional data model of a printing object. The three-dimensional data model can be decomposed into a plurality of two-dimensional images; the images will be transmitted to the image exposure system 120, and then be projected by the latter.

A printing object for any shaped object can be considered to consist of an internal entity covered by an exposed surface. The entity here occupies most of the space of the printing object. The deformation is caused by the internal stress from the volumetric shrink of the material. The internal stress is caused by three parts, the exothermic thermal stress, the interlayer lateral contraction force and the tensile stress from the shrink of current layer to the underlying cured model. The exposure light of the current layer is transmitted to the underlying cured model, causing the underlying model to shrink further. According to these principles of shrinkage, the exposure intensity to the entity can be weakened, and the heat release of the entity can be reduced. Or, by horizontal splitting, the large-area entity can be divided into checkerboard, well-shaped, and island-shaped bodies to reduce the deformation caused by lateral contraction. The strength of the link between the upper and lower layers can be weakened by vertical splitting. By vertical splitting, the tensile stress from the shrink of current layer to the underlying cured layer can be reduced, the light intensity of the exposure light which can be transmitted from the current layer to the underlying cured layer can also be weakened. The features of various aspects of the disclosure are described separately below.

According to an embodiment of the present disclosure, after the necessary pre-processing for area identification, the three-dimensional data model is sent to the image exposure system 120 for exposure.

Figure 2:
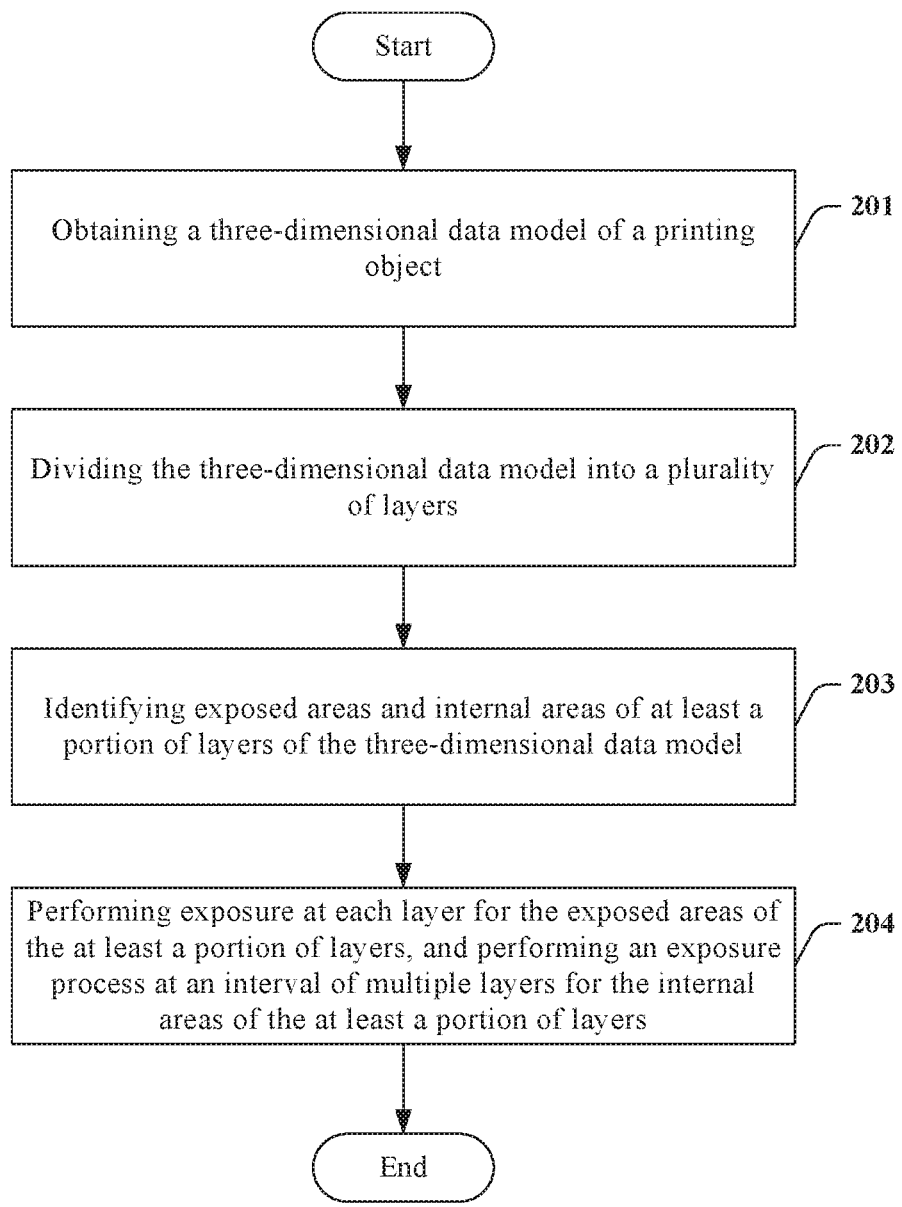
FIG. 2 is a flow chart showing a photocuring-type three-dimensional printing method according to an embodiment of the present disclosure.

FIG. 2 is a flow chart showing a photocuring-type three-dimensional printing method according to an embodiment of the present disclosure. Referring to FIG. 2, the method includes the following steps:

In step 201, obtaining a three-dimensional data model of a printing object;

In step 202, dividing the three-dimensional data model into a plurality of layers;

In step 203, identifying exposed areas and internal areas of at least a portion of layers of the three-dimensional data model;

In step 204, performing exposure at each layer for the exposed areas of the at least a portion of layers, and performing an exposure process at an interval of multiple layers for the internal areas of the at least a portion of layers.

Figure 3A:
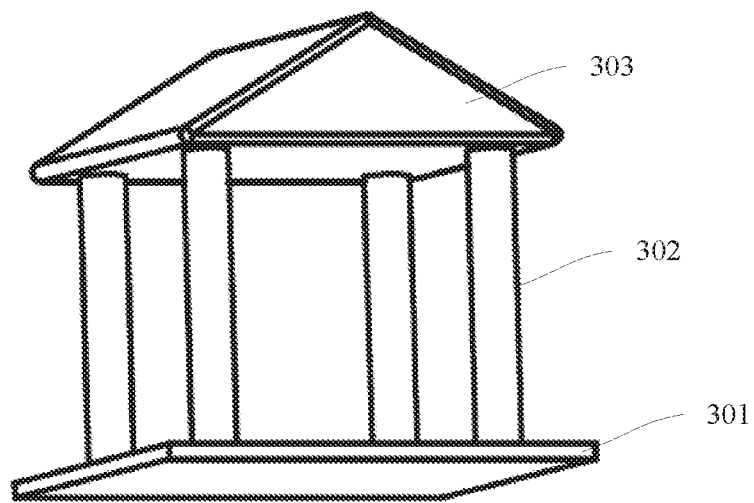
FIG. 3A is a three-dimensional data model according to an embodiment of the present disclosure.
Figure 3B:
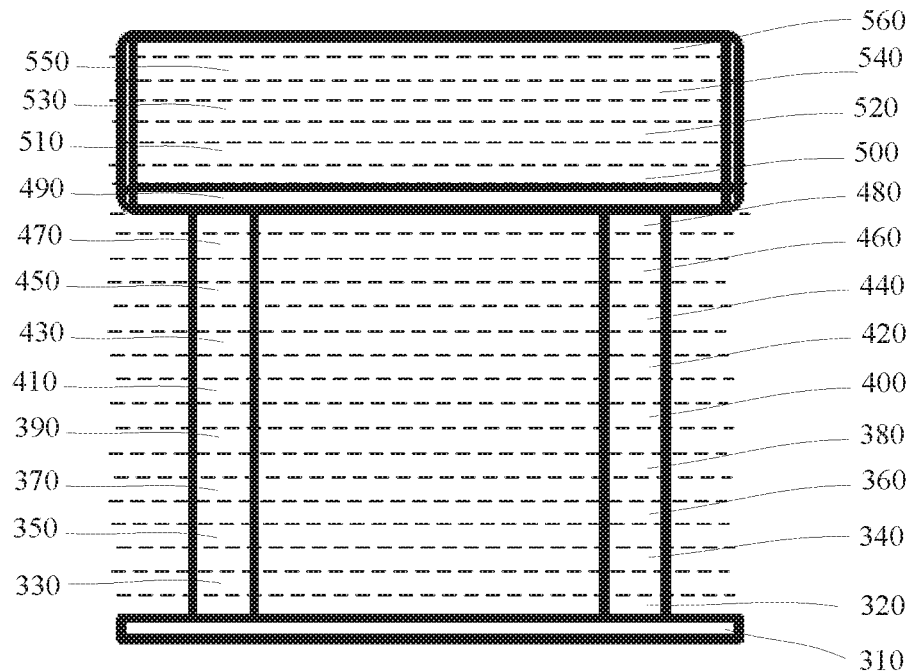
FIG. 3B is a hierarchical diagram of a three-dimensional data model according to an embodiment of the present disclosure.

FIG. 3A is a three-dimensional data model according to an embodiment of the present disclosure. Referring to FIG. 3A, the three-dimensional data model 300 is a house model which has a foundation 301, a plurality of pillars 302, and a roof 303. FIG. 3B is a hierarchical diagram of a three-dimensional data model according to an embodiment of the present disclosure. As shown in FIG. 3B, step 202 is to divide, for example, the three-dimensional data model 300 into a plurality of layers 310, 320, 330, . . . , 560. Each layer is used to cure the resin once in 3D printing to form a layer of photocurable resin. The order of curing is, for example, starting from 310, in order of 320, 330, up to 560. The two-dimensional plane of each layer can contain hundreds of pixels or even tens of thousands of pixels.

Figure 4A:
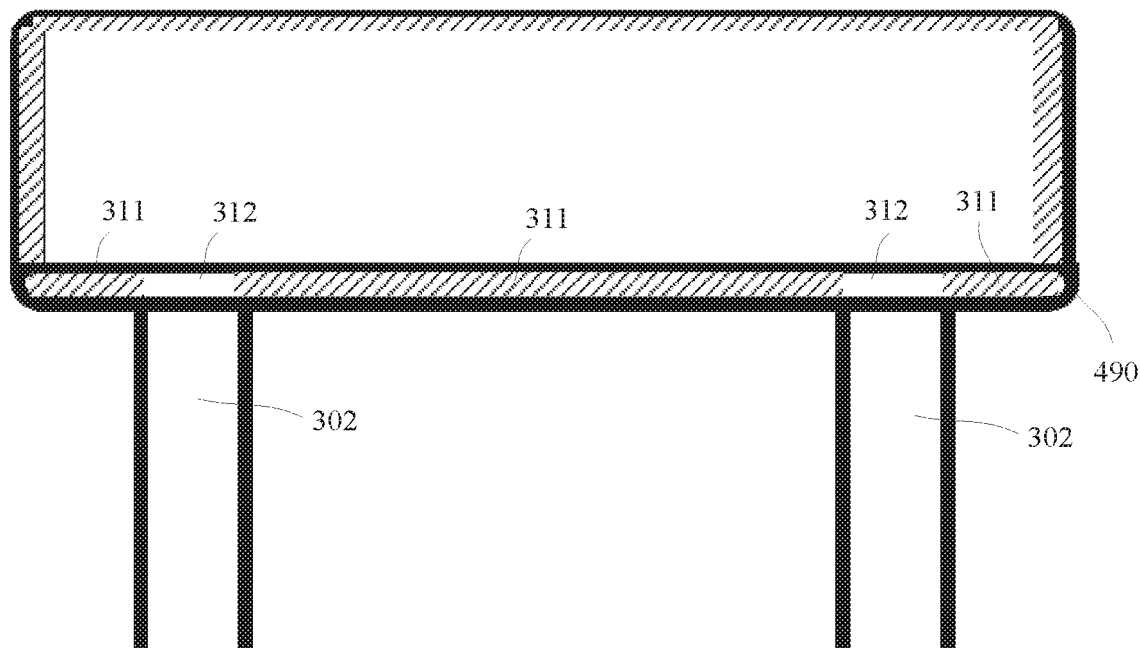
FIG. 4A is a schematic diagram of three-dimensional data model area identification according to an embodiment of the present disclosure.

FIG. 4A is a schematic diagram of three-dimensional data model area identification according to an embodiment of the present disclosure. Referring to FIG. 4A, step 203 identifies at least a portion of layers of the three-dimensional data model 300, such as layer 490. It identifies the exposed area 311 and internal area 312. Exposed areas, as the name suggests, are areas that are not covered in the molded workpiece. The exposed area includes an upper shell, side edges, and a bottom shell. As shown in FIG. 4A, since only four pillars 302 (two shown in FIG. 4A) are supported under the layer 490, the exposed area 311 is the bottom shell (slashed shadow in the figure) besides the pillars. The internal area is the covered area. For example, the bottom surface of the internal area 312 is covered by its supporting portion, both sides are covered by the exposed area 311, and the top surface is covered by other internal areas.

Figure 4B:
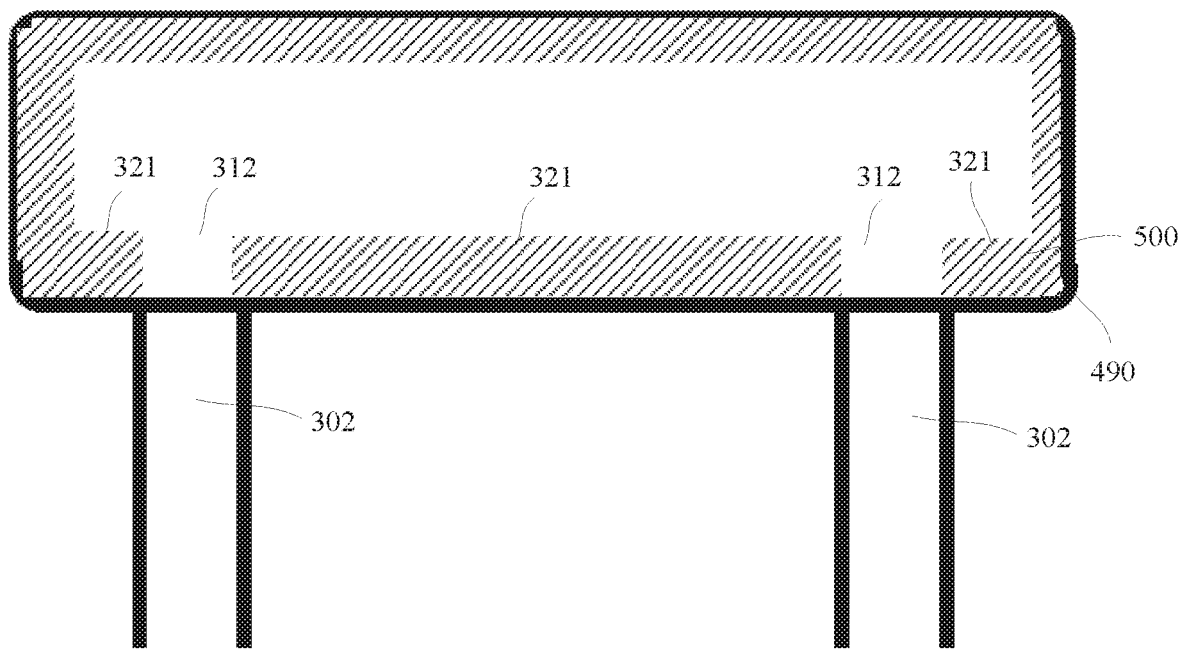
FIG. 4B is a schematic diagram of three-dimensional data model area identification according to another embodiment of the present disclosure.

The area identification from layers 500 to 560 is analogous and will not be expanded here. The identified exposed areas for these layers are shown in FIG. 4A, indicated by slashed shadow. The exposed areas can be set to a thickness in its normal direction, for example, 1-5 pixels. Referring to FIG. 4B, the exposed area 321 extends from layer 490 through layer 500.

Figure 5A:
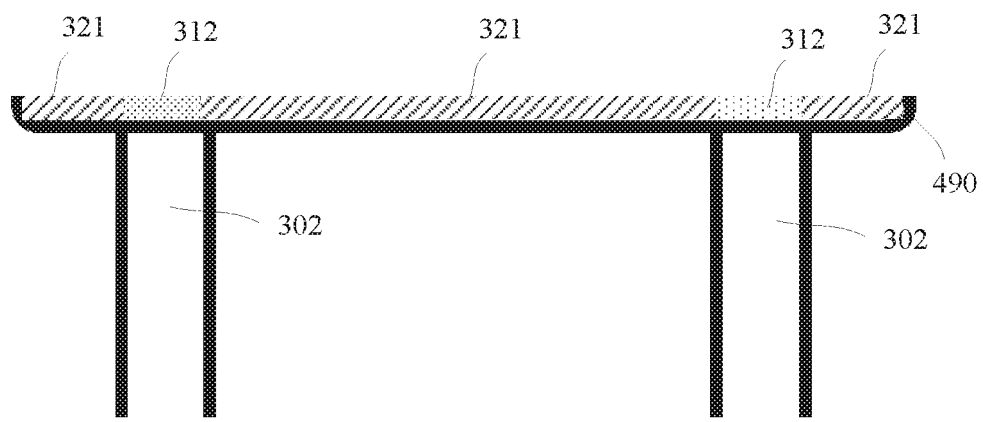
FIG. 5A-5D is a schematic diagram of printing at an interval of multiple layers according to an embodiment of the present disclosure.
Figure 5B:
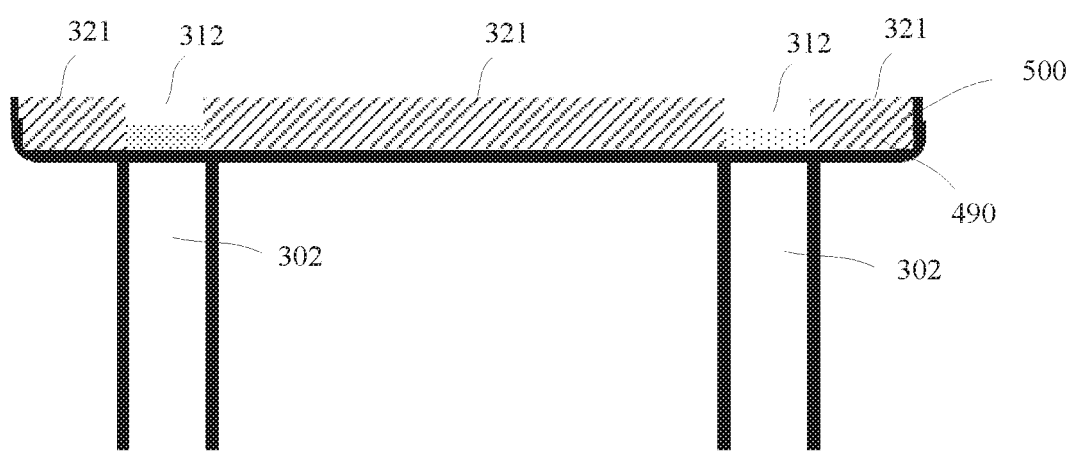
Figure 5C:
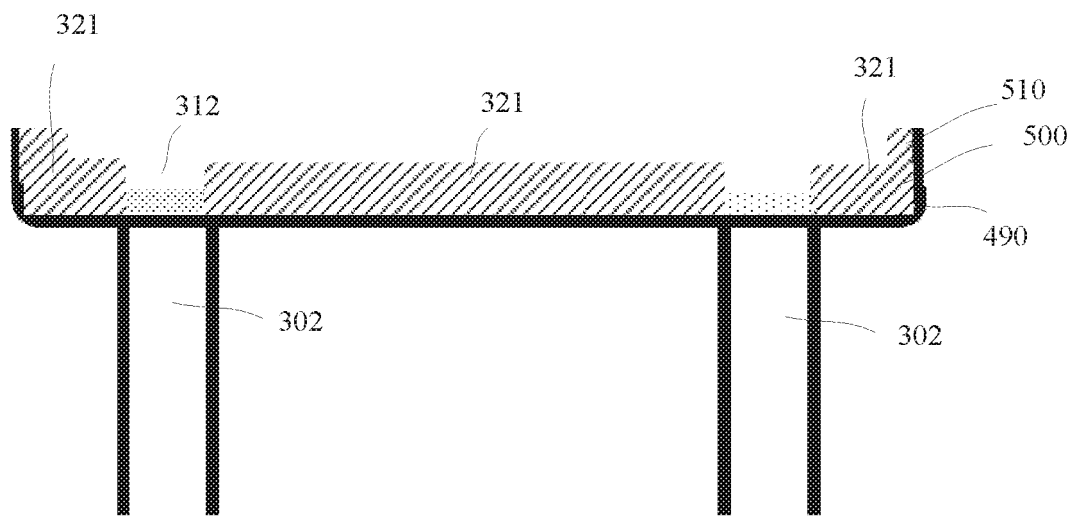
Figure 5D:
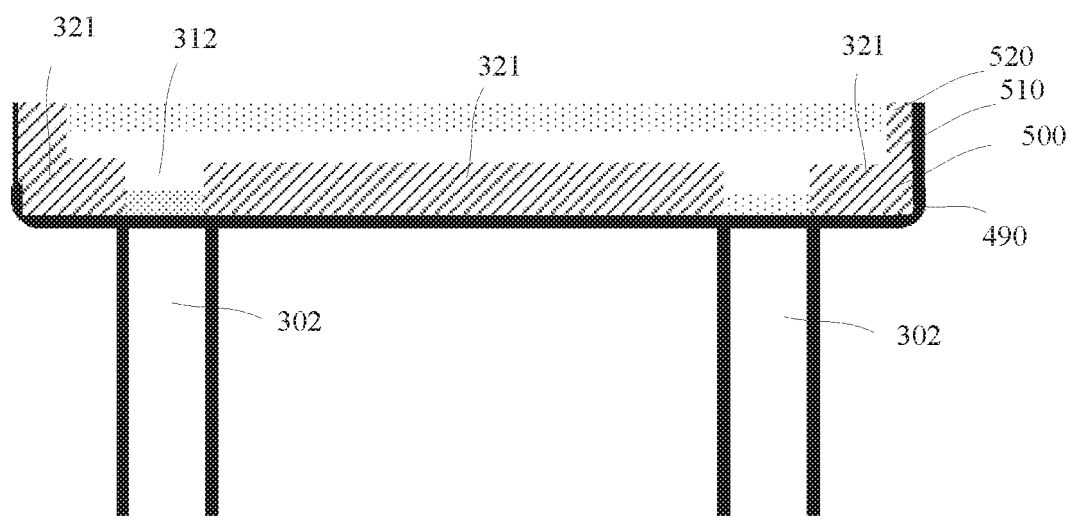

As in the previous said step 204, performing exposure at each layer for the exposed areas of the various layers, and performing an exposure process at an interval of multiple layers for the internal areas of the various layers. FIG. 5A-5D is a schematic diagram of printing at an interval of multiple layers according to an embodiment of the present disclosure. Referring first to FIG. 5A, the exposed area (slashed shadow area) 321 of layer 490 is exposed, and the internal area 312 (dotted shadow area) is exposed. Secondly, referring to FIG. 5B, the exposed area (slashed shadow area) 321 of layer 500 is exposed, but the internal area 312 is not exposed. And then referring to FIG. 5C, the exposed area (slashed shadow area) 321 of the layer 510 is also exposed, but the internal area 312 is not exposed. And further referring to FIG. 5D, the exposed area (slashed shadow area) of the layer 520 is exposed, and the internal area (dotted shadow area) is exposed. Thus, an exposure process is performed at intervals of two layers, which can block the influence of shrink between the layers of the resin. For example, layer 500 is unexposed and does not create a contraction force on layer 490, and the contraction force generated by the exposure of layer 520 acts on the unexposed layer 510, the layer 510 would not shrink and transmit the contraction force to layer 490. The curing degree of the photocurable resin is a gradient, the side facing to the light has high curing strength, and the other side has low curing strength. When implemented, the number of interval layers can be adjusted depending on the curing depth of the resin. For example, for a layer thickness of 0.1 mm, if the curing depth of the resin is 0.3 mm, then the number of interval layers may be two layers. Thus, the contact area with the cured model is neither completely liquid nor completely solid, the workpiece has a certain strength, the layers can slide, and the upper layer has little influence on the lower layer.

Figure 5E:
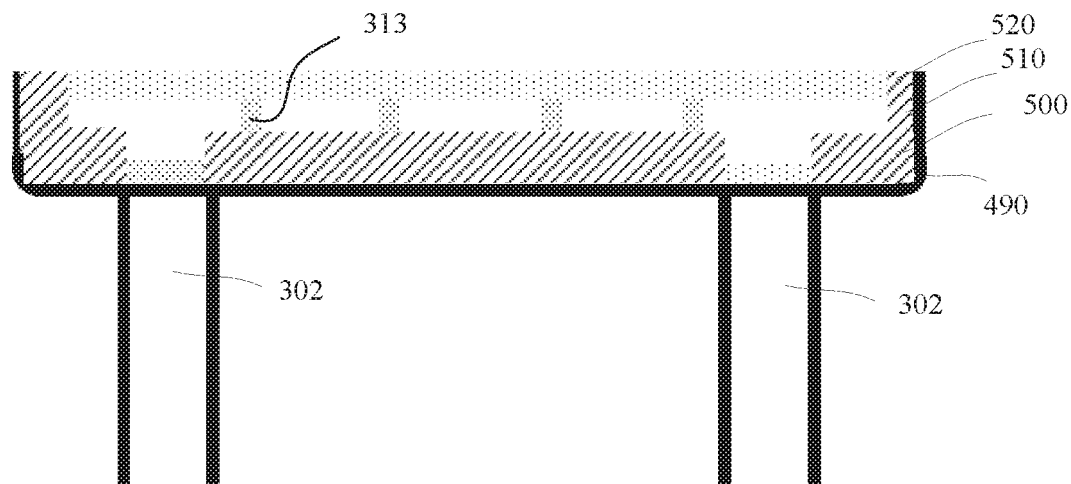
FIG. 5E is a schematic diagram of a printed structure having support pillar according to an embodiment of the present disclosure.

In one embodiment, the unexposed layer of the entity area dose not completely without exposure, but can build some support pillars 313 by partial exposure, as shown in FIG. 5E. In this way, the strength of the layer can be increased to ensure a certain connection between the upper and lower layers.

For larger workpieces, even the exposure on single layer with large area has problems of shrinking and heat generating. Therefore, in an embodiment of the present disclosure, a regional exposure technique for single layer is further introduced.

Figure 6:
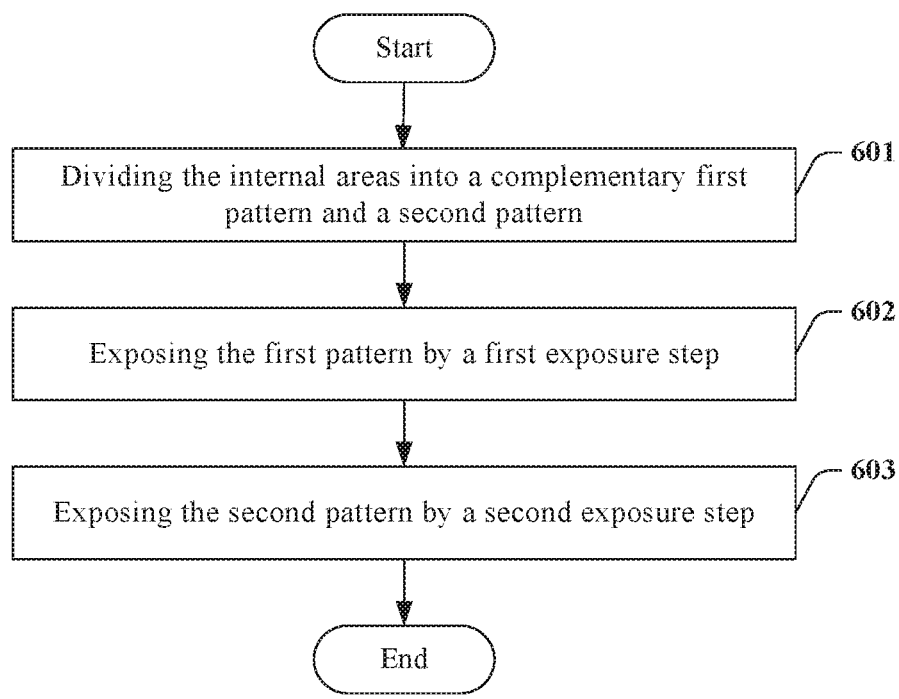
FIG. 6 is an internal area exposure process according to an embodiment of the present disclosure.

FIG. 6 is an internal area exposure process according to an embodiment of the present disclosure. Referring to FIG. 6, the process includes the following steps:

In step 601, dividing the internal areas into a complementary first pattern and a second pattern;

In step 602, exposing the first pattern by a first exposure step; and

In step 603, exposing the second pattern by a second exposure step.

Figure 7:
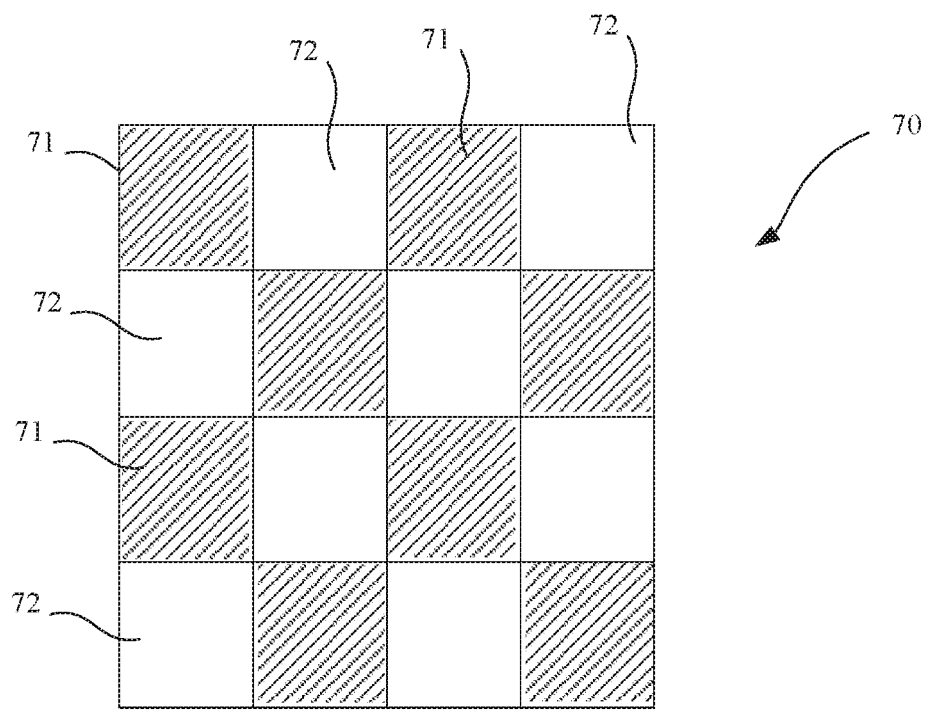
FIG. 7 is a schematic diagram of pattern discrimination according to an embodiment of the present disclosure.

FIG. 7 is a schematic diagram of pattern discrimination according to an embodiment of the present disclosure. Referring to FIG. 7, the first pattern 71 and the second pattern 72 of the present embodiment are diagonal squares in the checkerboard 70. The first pattern 71 and the second pattern 72 are complementary, each consisting of equal-sized squares that are not connected to each other. Here, the size of the square can be defined by user, and the square size is better at 2-20 pixels.

Figure 8A:
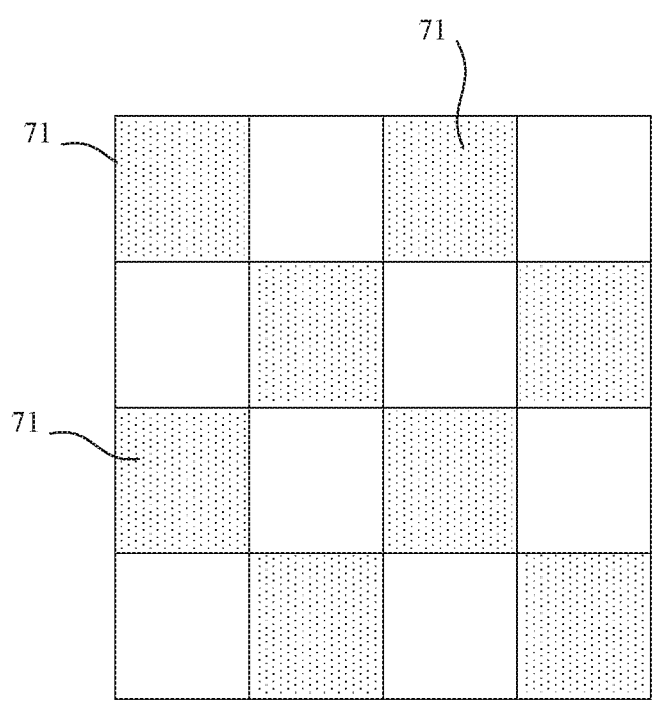
FIGS. 8A and 8B are regional exposure process according to an embodiment of the present disclosure.
Figure 8B:
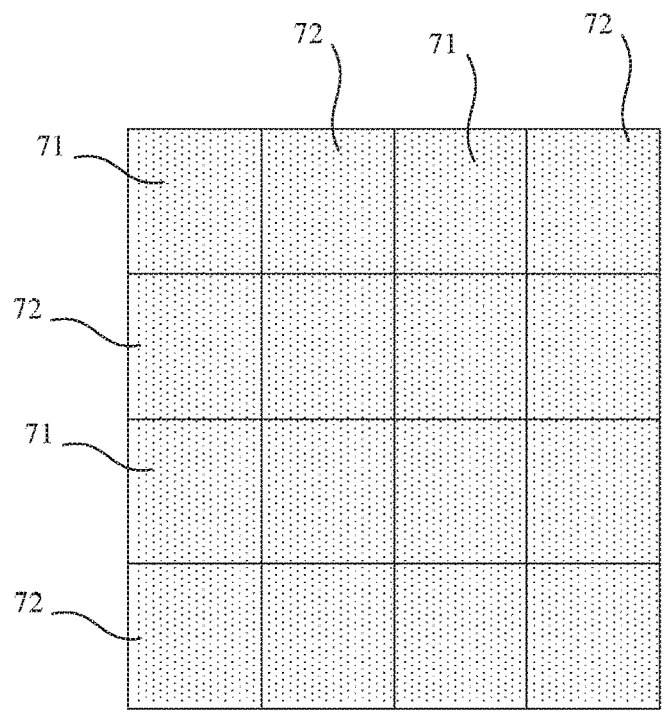

FIGS. 8A and 8B are regional exposure process according to an embodiment of the present disclosure. Referring to FIGS. 8A and 8B, the first exposure step is to expose the first pattern 71 at first, and the second exposure step is to expose the second pattern 72, although the order may be reversed. Regardless of the influence between layers, for the first exposure, because the exposed areas are not connected at all, so its contraction has no effect on the overall deformation; for the second exposure, the contraction connects the exposed areas of the entity and lead to deformation. However, there are improvement overall.

Figure 9:
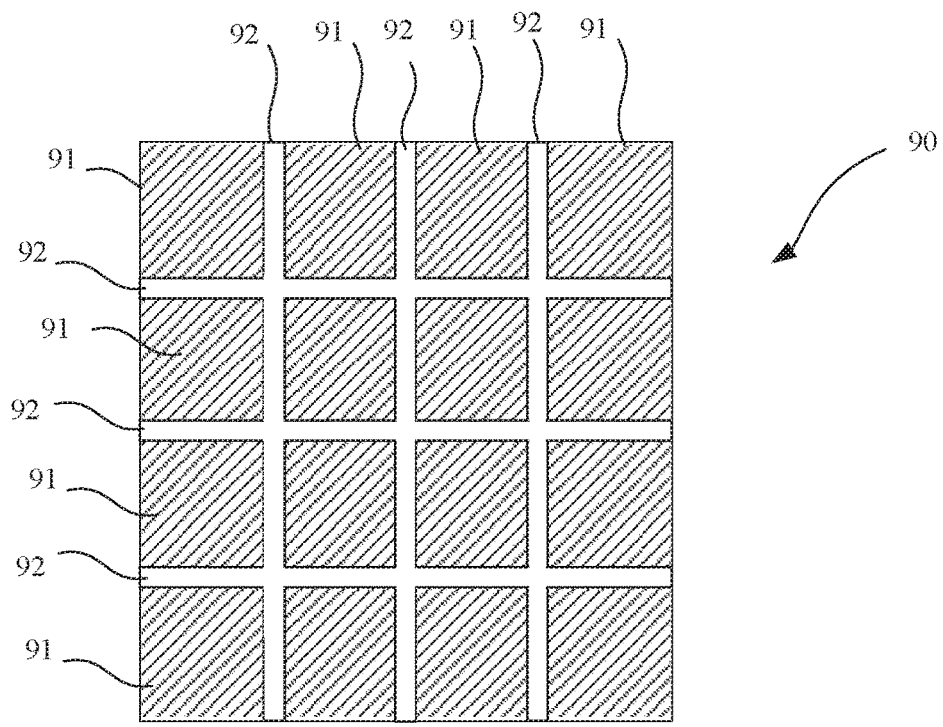
FIG. 9 is a schematic diagram of pattern discrimination according to another embodiment of the present disclosure.

FIG. 9 is a schematic diagram of pattern discrimination according to another embodiment of the present disclosure. Referring to FIG. 9, in the pattern 90 of the present embodiment, the first pattern 91 is a square separated by well-shaped stripe, and the second pattern 92 is well-shaped stripe. Here, the square can be defined as 10-50 pixels, and the well-shaped stripes are, in one embodiment, 2-10 pixels.

Figure 10A:
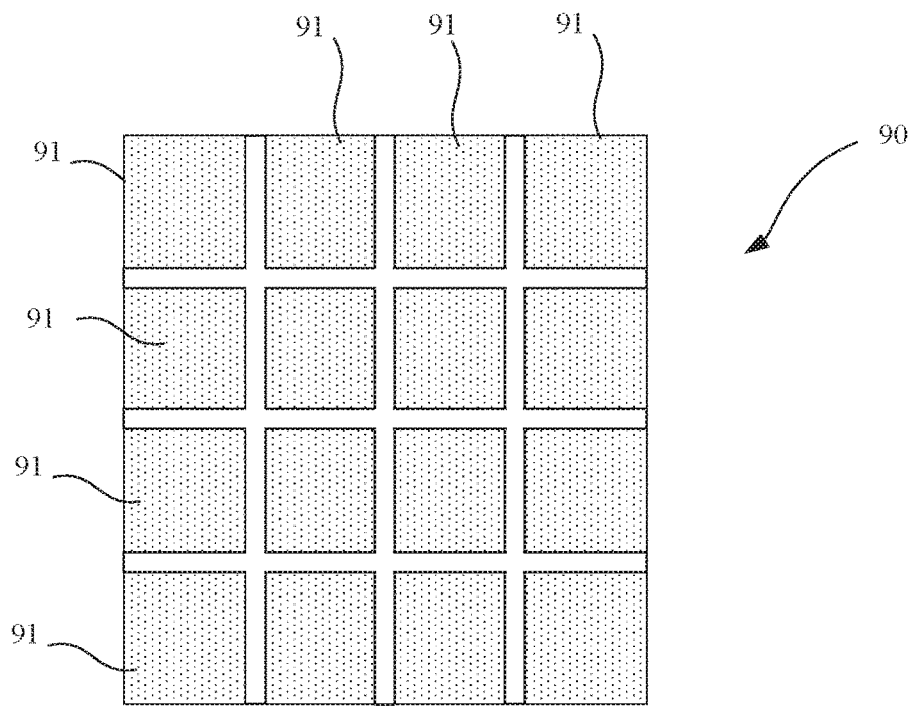
FIGS. 10A and 10B are internal area exposure process according to another embodiment of the present disclosure.
Figure 10B:
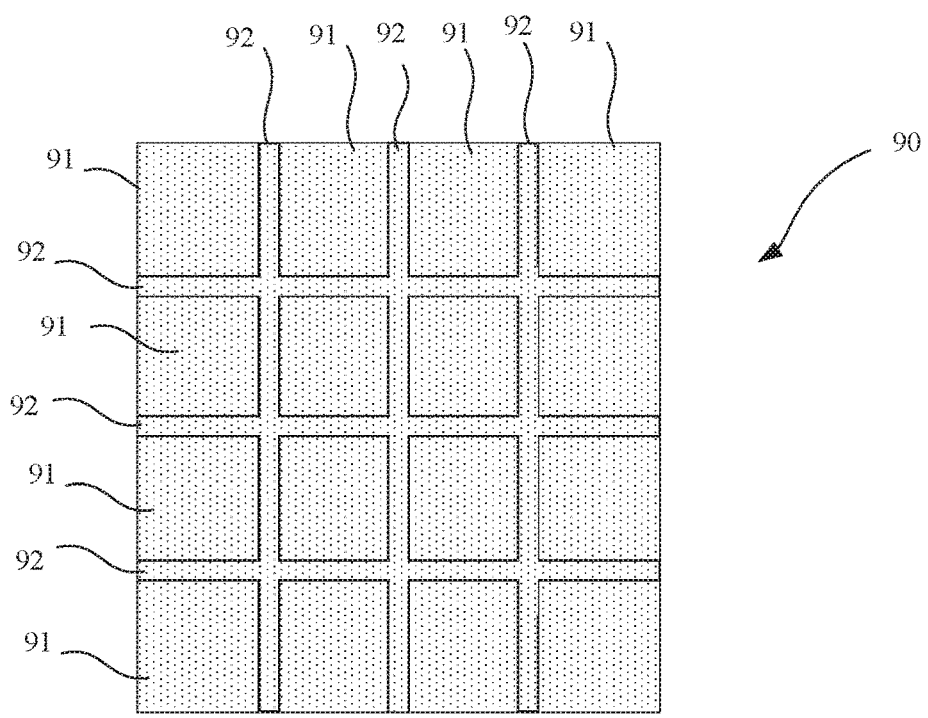

FIGS. 10A and 10B are internal area exposure process according to another embodiment of the present disclosure. Referring to FIGS. 10A and 10B, the first exposure step exposes the first pattern 91 first, and the second exposure step exposes the second pattern 92. Regardless of the influence between layers, for the first exposure of square, because the exposed areas are not connected at all, so its contraction has no effect on the overall deformation; for the second exposure, the contraction connects the exposed areas of the entity and lead to deformation, but due to the well-shaped stripes are relative small compared to the square, the influence can be ignored.

In steps 602 and 603, the device can control the image exposure system 120 to perform the first and second exposures. Here, the times of the first and second exposures may be partially overlapped or may not overlapped at all.

Figure 11:
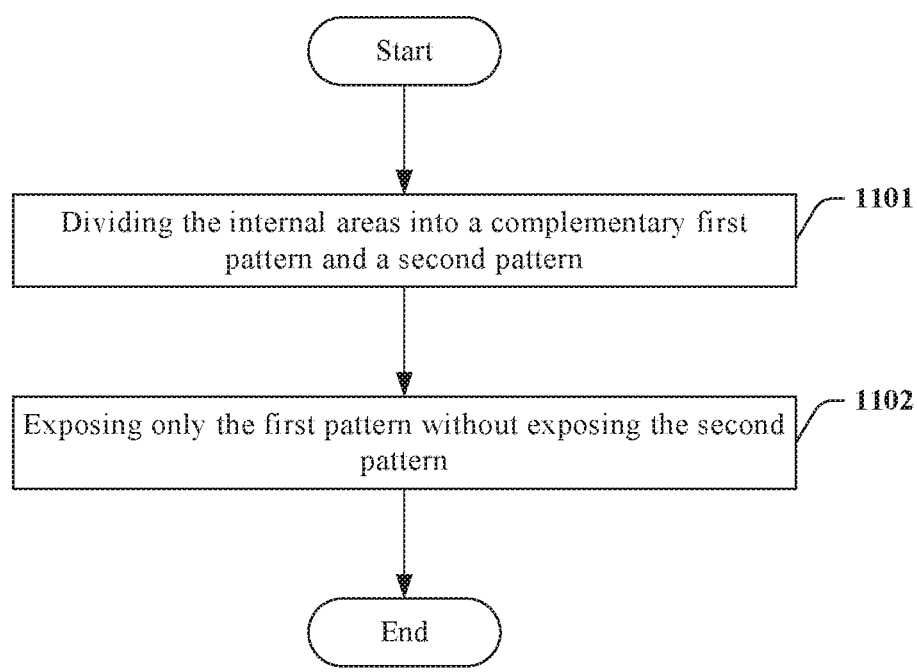
FIG. 11 is an internal area exposure process according to another embodiment of the present disclosure.

FIG. 11 is an internal area exposure process according to another embodiment of the present disclosure. Referring to FIG. 11, the process includes the following steps:

In step 1101, dividing the internal areas into a complementary first pattern and a second pattern; In step 1102, exposing only the first pattern without exposing the second pattern.

This embodiment further provides a non-exposed area in the layer of the entity area where the exposure process has been performed, thereby the mutual influence of the contraction of the entity area is further reduced. This embodiment hopes to control the size of the second pattern to be smaller than the first pattern so as not to significantly reduce the strength of the entity area. The combination of the first pattern and the second pattern which are matched with this embodiment is the combination shown in FIG. 9.

In each of the previous embodiments, there is a displacement between the first pattern and the second pattern of each layer of the three dimensional data model. The displacement can be random so that the unexposed areas can be joined together. In an alternative embodiment, the first pattern and the second pattern of each layer of the three-dimensional data model may also not be displaced, such that the squares are completely unconnected. However, for the example of the well-shaped stripes combined with squares, as long as the well-shaped stripes are thin enough, there will be a weak connection between the actual squares.

Further, according to an embodiment of the present disclosure, different exposure intensities can be assigned to the exposed area and the internal area of the printing object. Specifically, the exposure intensity of the internal area is weaker than the exposure intensity of the exposed area. Since the internal entities account for the vast majority of the printed workpiece, the overall heating and contraction can be greatly reduced.

Figure 12:
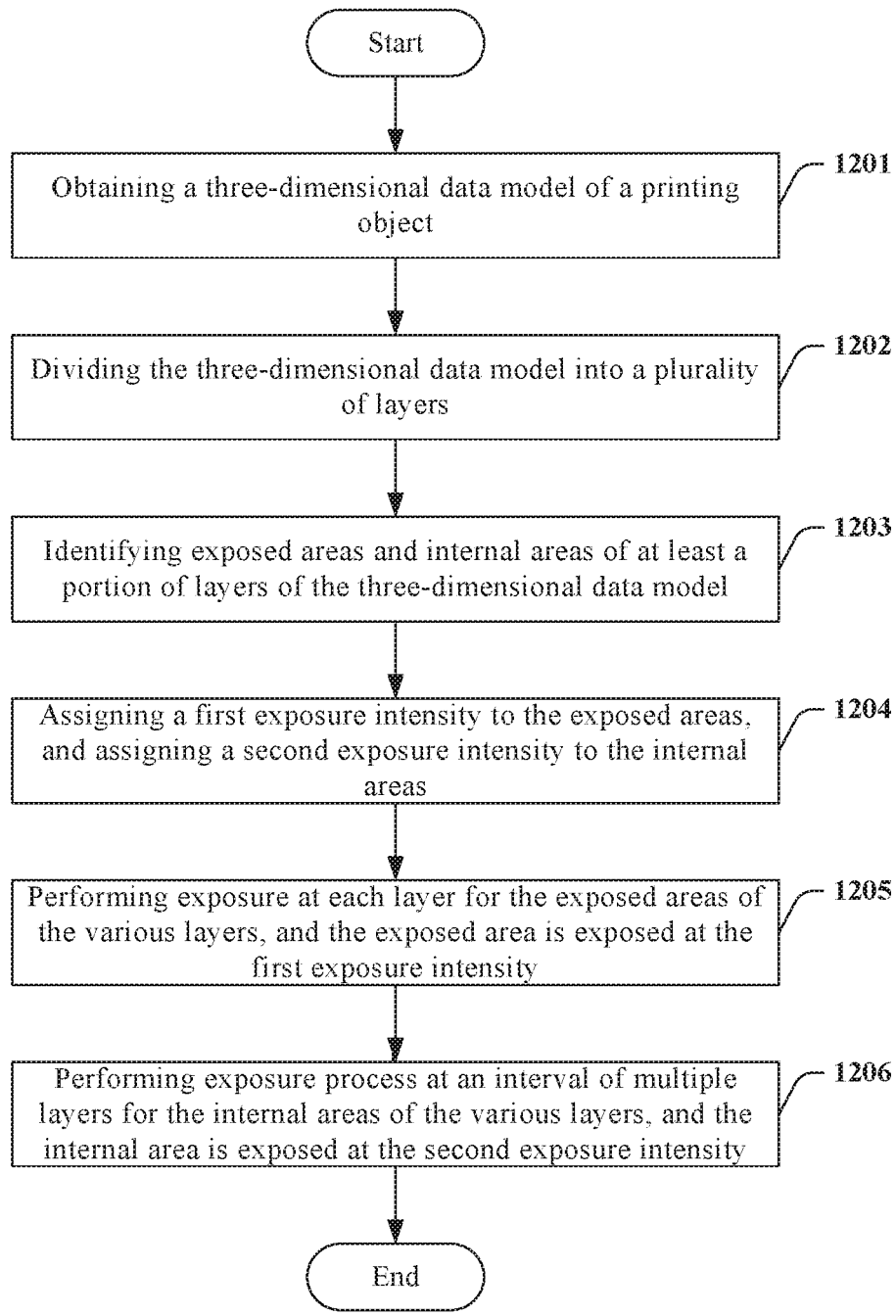
FIG. 12 is a flow chart showing a photocuring-type three-dimensional printing method according to another embodiment of the present disclosure.

FIG. 12 is a flow chart showing a photocuring-type three-dimensional printing method according to another embodiment of the present disclosure. Referring to FIG. 12, the method includes the following steps:

In step 1201, obtaining a three-dimensional data model of a printing object.

In step 1202, dividing the three-dimensional data model into a plurality of layers.

In step 1203, identifying exposed areas and internal areas of at least a portion of layers of the three-dimensional data model.

In step 1204, assigning a first exposure intensity to the exposed areas, and assigning a second exposure intensity to the internal areas.

In step 1205, performing exposure at each layer for the exposed areas of the various layers, and the exposed area is exposed at the first exposure intensity.

In step 1206, performing exposure process at an interval of multiple layers for the internal areas of the various layers, and the internal area is exposed at the second exposure intensity.

Assigning the first exposure intensity to the exposed area and the second exposure intensity to the internal area in step 1204 may be achieved by setting the brightness of the image converted for each layer of data, or by using different exposure times, or be achieved by setting different brightness and exposure time simultaneously. Here, the first exposure intensity is greater than the second exposure intensity. That is to say, the exposure intensity of the exposed area is greater than the exposure intensity of the internal area. In one embodiment, the second exposure intensity does not exceed 66% of the first exposure intensity.

However, in order to maintain the strength of the entire printed workpiece and the reliable connection with the lifting platform 130, the higher first exposure intensity is uniformly assigned to a plurality of layers starting from the bottom of the three-dimensional data model 300.

In steps 1205 and 1206, the device can control the image exposure system 120 to expose the exposed area at a first exposure intensity and expose the internal area at a second exposure intensity.

Many three-dimensional models, such as buildings and hollowed-out sculptures, have complex structures. In these three-dimensional models, various supporting portions, especially the small supporting portions, have significant influence on the accuracy of the model. However, the supporting portion for supporting the large-area bottom shell is easily deformed by the contraction of the large-area bottom shell at the time of exposure. According to an embodiment of the present disclosure, different regions of the large-area bottom shell are exposed at different times can significantly reduce the degree of contraction of the large-area bottom shell upon exposure.

Figure 13:
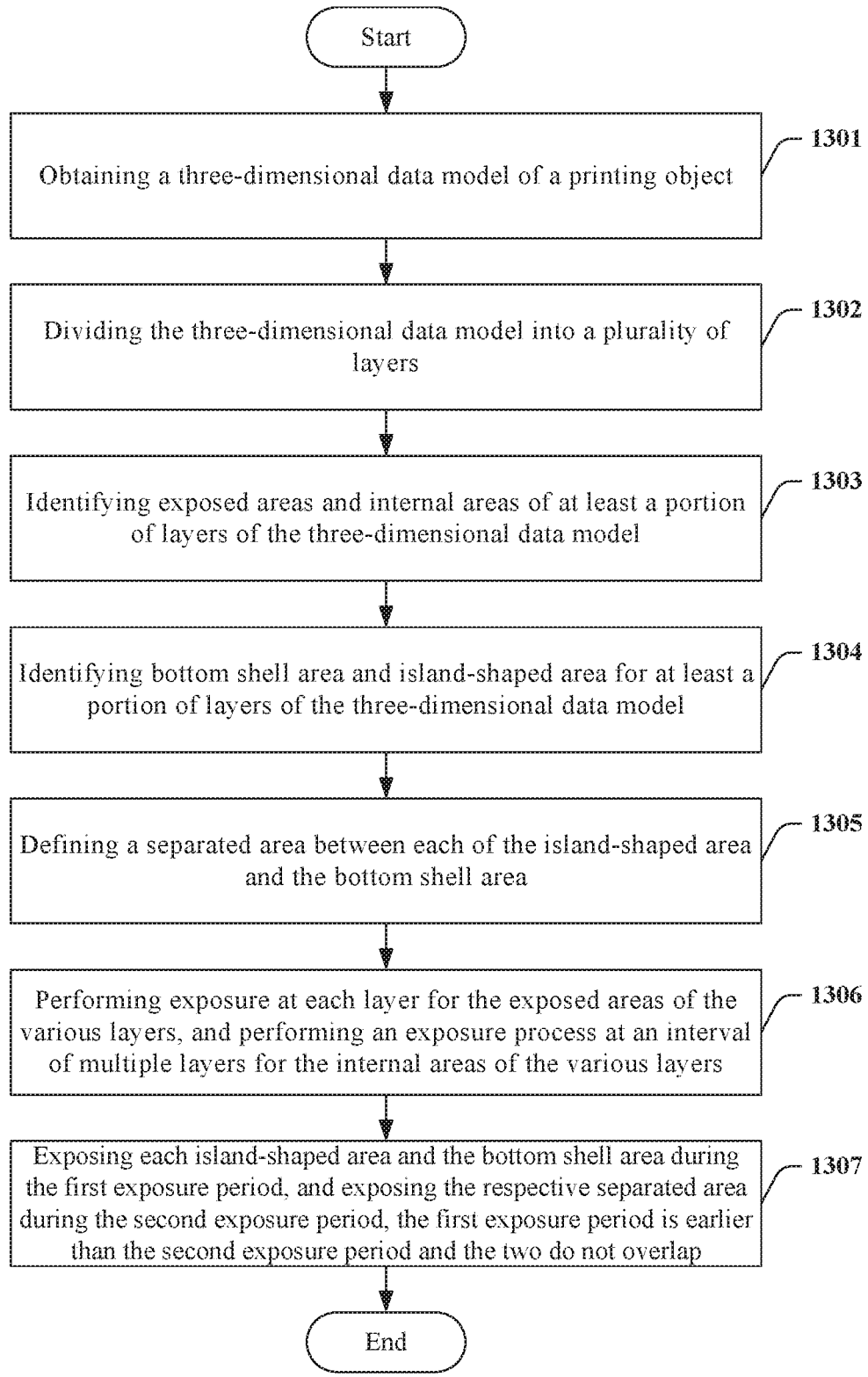
FIG. 13 is a flow chart showing a photocuring-type three-dimensional printing method according to still another embodiment of the present disclosure.

FIG. 13 is a flow chart showing a photocuring-type three-dimensional printing method according to still another embodiment of the present disclosure. Referring to FIG. 13, the method includes the following steps:

In step 1301, obtaining a three-dimensional data model of a printing object.

In step 1302, dividing the three-dimensional data model into a plurality of layers.

In step 1303, identifying exposed areas and internal areas of at least a portion of layers of the three-dimensional data model.

In step 1304, identifying bottom shell area has a size up to a threshold and island-shaped area of one or more supporting portions in the layer which are used for supporting the bottom shell area for at least a portion of the layers of the three-dimensional data model.

In step 1305, defining a separated area between each of the island-shaped area and the bottom shell area.

In step 1306, performing exposure at each layer for the exposed areas of the various layers, and performing an exposure process at an interval of multiple layers for the internal areas of the various layers.

In step 1307, when exposing each of the island-shaped area and the bottom shell area, exposing areas outside the separated area during the first exposure period, and exposing the respective separated area during the second exposure period, the first exposure period is earlier than the second exposure period and the two do not overlap.

The details of steps 1301, 1302, 1303, 1306 can be referred to the previous embodiment and will not be expanded here.

Figure 14A:
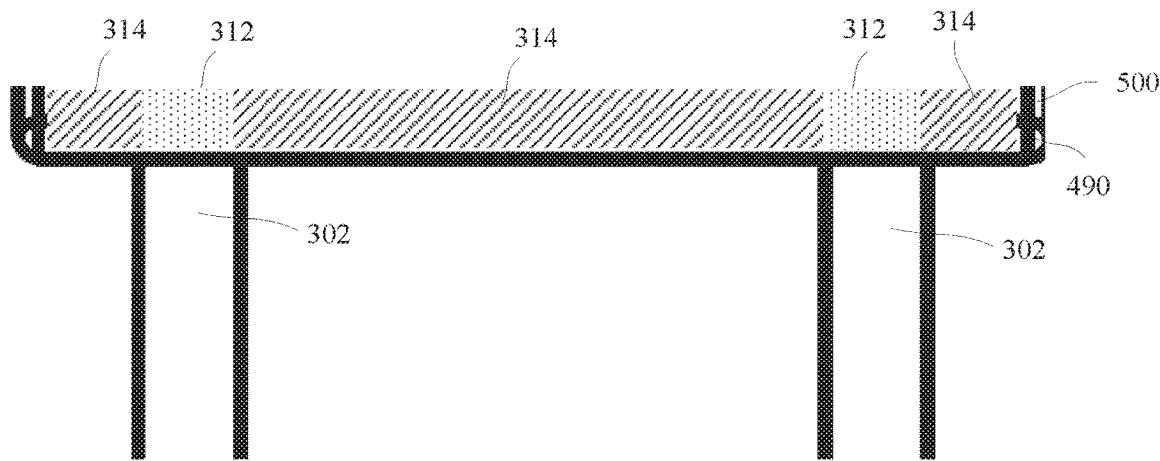
FIGS. 14A and 14B are schematic diagram of three-dimensional data model area identification according to an embodiment of the present disclosure.
Figure 14B:
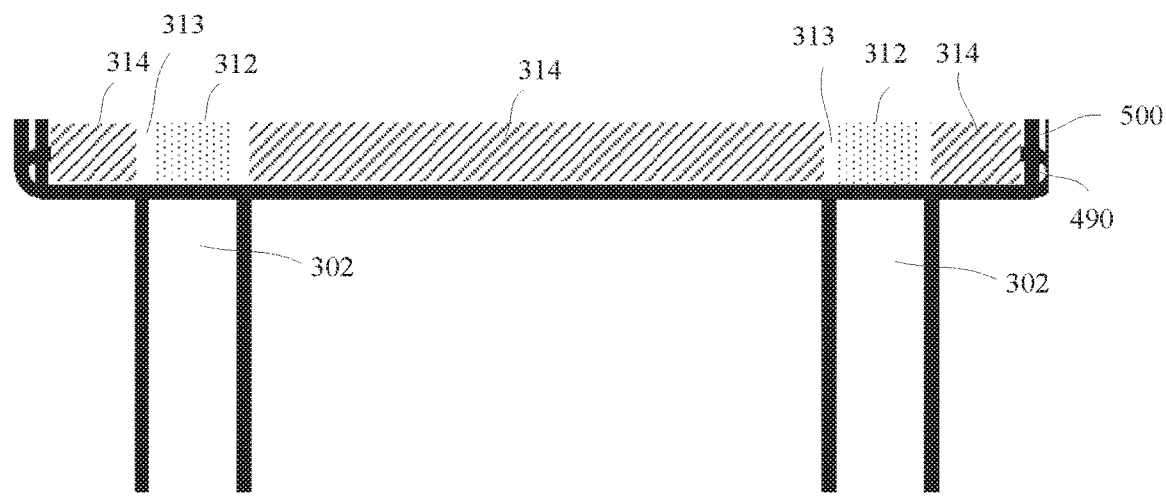

FIGS. 14A and 14B are schematic diagram of three-dimensional data model area identification according to an embodiment of the present disclosure. Referring first to FIG. 14A, step 1304 identifies at least a portion of layers of the three-dimensional data model 300, such as identifies the bottom shell area 314 and the island area 312 in layers 490 and 500. The bottom shell area 314 is the area in each of the layers 490, 500 that serves as the bottom shell of the three-dimensional data model 300. This area is exposed on the lower surface of the three-dimensional data model 300. The normal thickness of the bottom shell area 314 is, for example, 1-5 layers, and two layers are shown in the figure. The size of the bottom shell area 314 needs to reach a threshold. For example, the area of the bottom shell area 314 needs to reach a threshold S. Of course, it is also possible to specify that the size of a certain direction of the bottom shell area 314 needs to reach a certain threshold. The island-shaped area 312 is a region in which the supporting portion (four pillars 302 in this embodiment) for supporting the bottom shell area 314 is occupied in the layer where the bottom shell area is located. The island-shaped area 312 is connected to its corresponding supporting portion. Each of the bottom shell areas 314 can be supported by corresponding supporting portions (two of the four pillars are shown in the figure). Therefore, there will be one or more island-shaped area 312. The various supporting portions may be located at the edge of the three-dimensional model 300 or at the non-edge of the three-dimensional model 300.

When identifying the bottom shell area 314 and the island-shaped area 312 of a layer, the layer can be compared with its previous layer, and the part of the layer that is not blocked by the previous layer is the bottom shell area, when the size of this area reaches the threshold, the identification result which is required in step 1304 will be obtained. Further, if the area which is laterally surrounded by the bottom shell area is an island-shaped area, it is indicated that the area is connected to the supporting portion of the previous layer.

It can be understood that the bottom shell area and the exposed area are partially overlapped, and the island-shaped area and the internal area may also overlap.

With continued reference to FIG. 14B, in step 1305, a separated area 313 is defined between each island-shaped area 312 and the bottom shell area 314. The separated area 313 is used to separate the island-shaped area 312 from the bottom shell area 314. The width of the separated area 313 is, for example, 2 to 10 pixels. The separated area 313 may be all segmented from the bottom shell area 314. Thus, the bottom shell area 314 is correspondingly downsized. Alternatively, the separated area 313 may be partially segmented from each island-shaped area 312 and partially segmented from the bottom shell area 314. Thus, the bottom shell area 314 and the island-shaped area 312 are correspondingly downsized.

In step 1307, when the island-shaped area 312 and the bottom shell area 314 are exposed, areas outside the respective separated areas 313 are first exposed during the first exposure period, including the bottom shell area 314 and the island-shaped area 312 (slashed shadow and dotted shadow in FIG. 14B), and then each of the separated areas 313 is exposed during the second exposure period. That is, the first exposure period is earlier than the second exposure period.

In step 1307, the device may control the image exposure system 120 to expose each island-shaped areas and bottom shell areas. The areas outside the separated areas will be exposed during the first exposure period, and each of the separated areas will be exposed during the second exposure period. The first exposure period is earlier than the second exposure period.

In the present embodiment, since the bottom shell area 314 and the island-shaped area 312 which are exposed during the first exposure period have been separated, the shrink of the large-area bottom shell area 314 does not affect the island-shaped area 312. Therefore, the supporting portion in the previous layer which is connected to the island-shaped area 312 in current layer is not affected. In contrast, in the second exposure period, for the size of the separated area 313 is small, so the shrink of the separated area 313 has little influence on the supporting portion.

The exposure process described above only involves the bottom shell area 314 with large-area and the island-shaped area 312 surrounded by the bottom shell area 314. The other areas of the same layer may be exposed as existing or other manners. For example, other areas may be exposed during the first exposure period, or exposed during the second exposure period, or exposed both at the first exposure period and the second exposure period with appropriate exposure intensity control.

In this embodiment, the first exposure period and the second exposure period do not overlap at all, that is, after the end of the first exposure period, the second exposure period begins.

In addition, in consideration of the connection strength and the reliable connection between the model and the lifting platform 130, the method of the present embodiment may not be used in the exposure of several layers starting from the bottom of the three-dimensional model 300. That is to say, the several layers can be exposed as a whole during the same exposure period.

Figure 15:
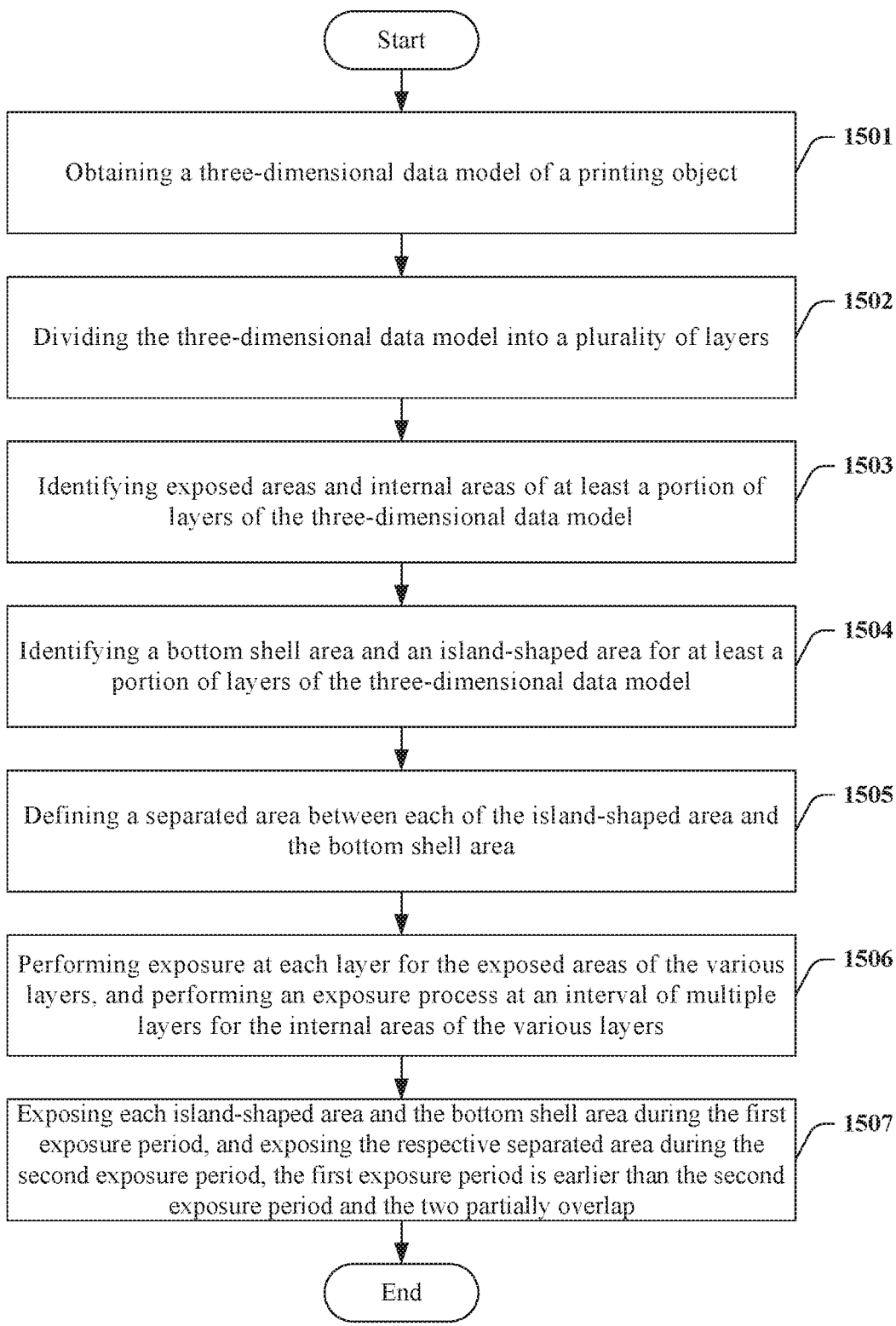
FIG. 15 is a flow chart showing a photocuring-type three-dimensional printing method according to still another embodiment of the present disclosure.

FIG. 15 is a flow chart showing a photocuring-type three-dimensional printing method according to still another embodiment of the present disclosure. Referring to FIG. 15, the method includes the following steps:

In step 1501, obtaining a three-dimensional data model of a printing object.

In step 1502, dividing the three-dimensional data model into a plurality of layers.

In step 1503, identifying exposed areas and internal areas of at least a portion of layers of the three-dimensional data model.

In step 1504, identifying bottom shell area has a size up to a threshold and island-shaped area of one or more supporting portions in the layer which are used for supporting the bottom shell area for at least a portion of layers of the three-dimensional data model.

In step 1505, defining a separated area between each of the island-shaped area and the bottom shell area.

In step 1506, performing exposure at each layer for the exposed areas of the various layers, and performing an exposure process at an interval of multiple layers for the internal areas of the various layers.

In step 1507, when exposing each of the island-shaped area and the bottom shell area, exposing areas outside the separated area during the first exposure period, and exposing the respective separated area during the second exposure period, the first exposure period is earlier than the second exposure period and the two partially overlap.

The details of steps 1501, 1502, 1503, 1506 can be referred to the previous embodiment and will not be expanded here.

FIGS. 14A and 14B are schematic diagram of three-dimensional data model area identification according to an embodiment of the present disclosure. Referring first to FIG. 14A, step 1504 identifies at least a portion of layers of the three-dimensional data model 300, such as identifies the bottom shell area 314 and the island area 312 in layers 490 and 500. The bottom shell area 314 is the area in each of the layers 490, 500 that serves as the bottom shell of the three-dimensional data model 300. This area is exposed on the lower surface of the three-dimensional data model 300. The normal thickness of the bottom shell area 314 is, for example, 1-5 layers, and two layers are shown in the figure. The size of the bottom shell area 314 needs to reach a threshold. For example, the area of the bottom shell area 314 needs to reach a threshold S. Of course, it is also possible to specify that the size of a certain direction of the bottom shell area 314 needs to reach a certain threshold. The island-shaped area 312 is a region in which the supporting portion (four pillars 302 in this embodiment) for supporting the bottom shell area 314 is occupied in the layer where the bottom shell area is located. The island-shaped area 312 is connected to its corresponding supporting portion. Each of the bottom shell areas 314 can be supported by corresponding supporting portions (two of the four pillars are shown in the figure). Therefore, there will be one or more island-shaped area 312. The various supporting portions may be located at the edge of the three-dimensional model 300 or at the non-edge of the three-dimensional model 300.

When identifying the bottom shell area 314 and the island-shaped area 312 of a layer, the layer can be compared with its previous layer, and the part of the layer that is not blocked by the previous layer is the bottom shell area, when the size of this area reaches the threshold, the identification result which is required in step 1504 will be obtained. Further, if the area which is laterally surrounded by the bottom shell area is an island-shaped area, it is indicated that the area is connected to the supporting portion of the previous layer.

With continued reference to FIG. 14B, in step 1505, a separated area 313 is defined between each island-shaped area 312 and the bottom shell area 314. The separated area 313 is used to separate the island-shaped area 312 from the bottom shell area 314. The width of the separated area 313 is, for example, 2 to 10 pixels. The separated area 313 may be all segmented from the bottom shell area 314. Thus, the bottom shell area 314 is correspondingly downsized. Alternatively, the separated area 313 may be partially segmented from each island-shaped area 312 and partially segmented from the bottom shell area 314. Thus, the bottom shell area 314 and the island-shaped area 312 are correspondingly downsized.

In step 1507, the device may control the image exposure system 120 to expose.

In the present embodiment, since the bottom shell area 314 and the island-shaped area 312 which are exposed during the first exposure period have been separated, the shrink of the large-area bottom shell area 314 does not affect the island-shaped area 312. Therefore, the supporting portion in the previous layer which is connected to the island-shaped area 312 in current layer is not affected. In the second exposure period, the size of the separated area 313 is small, and the bottom shell area 314 and the island-shaped area 312 which are simultaneously exposed with the separated area 313 have been exposed and shrunk, and their amount of shrinkage during the process of increasing the exposure intensity will be small, so the influence to the supporting portion is small.

In the present embodiment, the first exposure period and the second exposure period are partially overlapped, that is, before the end of the first exposure period, the second exposure period has begun. Even, the first exposure period continues until the end of the second exposure period. In this process, areas outside the respective separated areas 313 are first exposed in the first exposure period, including the bottom shell area 314 (slashed shadow in FIG. 4B) and the island-shaped area 312 (dotted shadow in FIG. 14B); When the first exposure period lasts for a certain time (for example, half), the second exposure period is started, and the separated area 313 (blank part in FIG. 14B) is exposed; Finally, the first exposure period and the second exposure period are ended together.

The exposure process described above involves only a large area of the bottom shell area 314 and the island-shaped area 312 surrounded by the bottom shell area 314. The other areas of the same layer may be exposed as existing or other manners. For example, other areas may be exposed during the first exposure period, or exposed during the second exposure period, or exposed both at the first exposure period and the second exposure period with appropriate exposure intensity control.

In addition, in consideration of the connection strength, the method of the present embodiment may not be used in the exposure of several layers starting from the bottom of the three-dimensional model 300.

Returning to FIG. 1, a computer may be included in the photocuring-type three-dimensional printing device 100 to perform the methods and steps involved. The computer can include memory and processor. The memory stores computer readable instructions. The processor executes the computer readable instructions to implement the steps described below: obtaining a three-dimensional data model of a printing object; dividing the three-dimensional data model into a plurality of layers; identifying exposed areas and internal areas of at least a portion of layers of the three-dimensional data model; performing exposure at each layer for the exposed areas of the at least a portion of layers, and performing an exposure process at an interval of multiple layers for the internal areas of the at least a portion of layers. Thus, the computer can control the image exposure system 120 to perform the desired exposure.

From another perspective, the present disclosure provides a photocuring-type three-dimensional printing device, comprising: a device for obtaining a three-dimensional data model of a printing object; a device for dividing the three-dimensional data model into a plurality of layers; a device for identifying exposed areas and internal areas of at least a portion of the layers of the three-dimensional data model; a device for performing exposure at each layer for the exposed areas of the at least a portion of layers, and performing an exposure process at an interval of multiple layers for the internal areas of the at least a portion of layers.

The above-described embodiments of the present disclosure can make other layers less affected by the shrink of each layer during the exposure process by performing exposure at intervals in the vertical direction of printing.

At the same time, the present disclosure exposes the areas regionally in horizontal direction in a large-area region, and exposes small areas that are not adjacent to each other at each exposure, which significantly reduces the shrinkage accumulation caused by the curing of large-area region exposure.

Furthermore, by distinguishing the exposed area and the internal area of the three-dimensional data model and exposing with different exposure intensities, the exposure intensity of the internal area can be made lower than that of the exposed area. As a result, the exposure intensity of the exposed area is much higher than that of the internal area, causing the main source of deformation—the amount of shrinkage of the internal entity area is significantly reduced, and the rise of temperature is reduced, so that the warpage and deformation problems of the three-dimensional model are improved.

In addition, by identifying those large-area bottom shell areas and the island-shaped areas connected by the formed supporting portions, a separated area is defined there between. During the exposure process, expose other areas before expose the separated area, so as to minimize the problem of the tensile stress applied to the supporting portions caused by the shrinkage during the overall exposure of the large area.

The basic concept has been described above is merely an example and does not constitute a limitation of the present application. Various modifications, improvements and amendments may be made, although not explicitly stated herein. Such modifications, improvements, and amendments are suggested in this application, and such modifications, improvements, and amendments are still within the spirit and scope of the exemplary embodiments of the present application.

Also, the present application uses specific words to describe embodiments of the present application. A "one embodiment", "an embodiment", and/or "some embodiments" mean a feature, structure, or characteristic associated with at least one embodiment of the present application. Therefore, it should be emphasized and noted that "an embodiment" or "one embodiment" or "an alternative embodiment" that is mentioned two or more times in different positions in specification does not necessarily refer to the same embodiment. Furthermore, some of the features, structures, or characteristics of one or more embodiments of the present application can be combined as appropriate.

Moreover, embodiments of the present application can be illustrated and described by a number of patentable categories or conditions, including any new and useful process, machine, product, or combination of materials, or any new and useful improvements. Accordingly, various aspects of the present application can be performed entirely by hardware, entirely by software (including firmware, resident software, microcode, etc.) or by a combination of hardware and software. The above hardware or software may be referred to as a "data block", "device", "engine", "unit", "component", or "system". Moreover, aspects of the present application may be embodied in a computer product located in one or more computer readable medium(s) including a computer readable program code.

While the disclosure has been described with respect to the embodiments of the present disclosure, the above embodiments are merely illustrative of the disclosure, various changes and replacements may be made without departing from the spirit and scope of the disclosure. Therefore, variations and modifications of the above-described embodiments within the scope of the spirit of the disclosure are intended to fall within the scope of the claims of the present application.

What is claimed is:

1. A photocuring-type three-dimensional printing method, comprising:
   obtaining a three-dimensional data model of a printing object;
   dividing the three-dimensional data model into a plurality of layers;
   identifying exposed areas and internal areas of at least a portion of layers of the three-dimensional data model; and
   performing exposure at each layer for the exposed areas of the at least a portion of layers, and performing a plane exposure process at an interval of multiple layers for the internal areas of the at least a portion of layers, wherein unexposed layers for the internal areas are completely unexposed.

2. The method of claim 1, wherein the exposing process comprises:
   dividing the internal areas into a complementary first pattern and a second pattern;
   exposing the first pattern by a first exposure step; and
   exposing the second pattern by a second exposure step.

3. The method of claim 1, wherein the exposing process comprises:
   dividing the internal areas into a complementary first pattern and a second pattern;
   exposing only the first pattern without exposing the second pattern.

4. The method of claim 2, wherein there is a displacement between the first pattern and the second pattern of each layer of the three-dimensional data model.

5. The method of claim 4, wherein the displacement is random.

6. The method of claim 2, wherein the first pattern and the second pattern are diagonal squares in a checkerboard.

7. The method of claim 6, wherein the one-dimensional size of each square is 2-20 pixels.

8. The method of claim 2, wherein the first pattern are squares separated by well-shaped stripe, the second pattern is well-shaped stripe.

9. The method of claim 8, wherein each square has a one-dimensional size of 10-50 pixels, and each well-shaped stripe has a width of 2-10 pixels.

10. The method of claim 2, wherein the time of the first exposure step partially overlaps the time of the second exposure step.

11. The method of claim 2, wherein the time of the first exposure step does not overlap with the time of the second exposure step.

12. The method of claim 1, further comprising:
   assigning a first exposure intensity to the exposed areas, and assigning a second exposure intensity to the internal areas, wherein the first exposure intensity is greater than the second exposure intensity; and
   exposing the exposed areas with the first exposure intensity, and exposing the internal areas with the second exposure intensity.

13. The method of claim 12, wherein the second exposure intensity does not exceed 66% of the first exposure intensity, wherein the exposed area includes an upper shell, side edges, and/or a bottom shell, wherein the normal thickness of the exposed area is 1-5 pixels, and wherein assigning the first exposure intensity uniformly to a plurality of layers starting from the bottom of the three-dimensional data model.

14. The method of claim 1, further comprising:
   identifying a bottom shell area of the exposed area having a size up to a threshold and an island-shaped area of one or more supporting portions in the layer which are used for supporting the bottom shell area for at least a portion of the layers of the three-dimensional data model;
   defining a separated area between each of the island-shaped area and the bottom shell area;
   exposing each of the island-shaped area and the bottom shell area during the first period, and exposing the respective separated area during the second period, the first period is earlier than the second period.

15. The method of claim 14, wherein at least a portion of the second period overlaps with the first period.

16. The method of claim 14, wherein the second period does not overlap with the first period.

17. The method of claim 14, wherein exposing the entire layer simultaneously for a plurality of layers starting from the bottom of the three-dimensional data model.

18. A photocuring-type three-dimensional printing device, comprising:
   memory to store computer readable instructions;
   processor, configured to execute the computer readable instructions to implement the steps described below:
   obtaining a three-dimensional data model of a printing object;
   dividing the three-dimensional data model into a plurality of layers;
   identifying exposed areas and internal areas of at least a portion of layers of the three-dimensional data model;
   performing exposure at each layer for the exposed areas of the at least a portion of layers, and performing a plane exposure process at an interval of multiple layers for the internal areas of the at least a portion of layers, wherein unexposed layers for the internal areas are completely unexposed.

19. A non-transitory computer readable medium containing instructions which, when executed by a processor, cause the processor to control a photocuring-type three-dimensional printing device to perform:
   obtaining a three-dimensional data model of a printing object;
   dividing the three-dimensional data model into a plurality of layers;
   identifying exposed areas and internal areas of at least a portion of the layers of the three-dimensional data model;
   performing exposure at each layer for the exposed areas of the at least a portion of layers, and performing a plane exposure process at an interval of multiple layers for the internal areas of the at least a portion of layers, wherein unexposed layers for the internal areas are completely unexposed.

* * * * *